BARNARD, NYE & HEWITT.
Harvester.
No. 81,129.                        Patented Aug. 18, 1868.
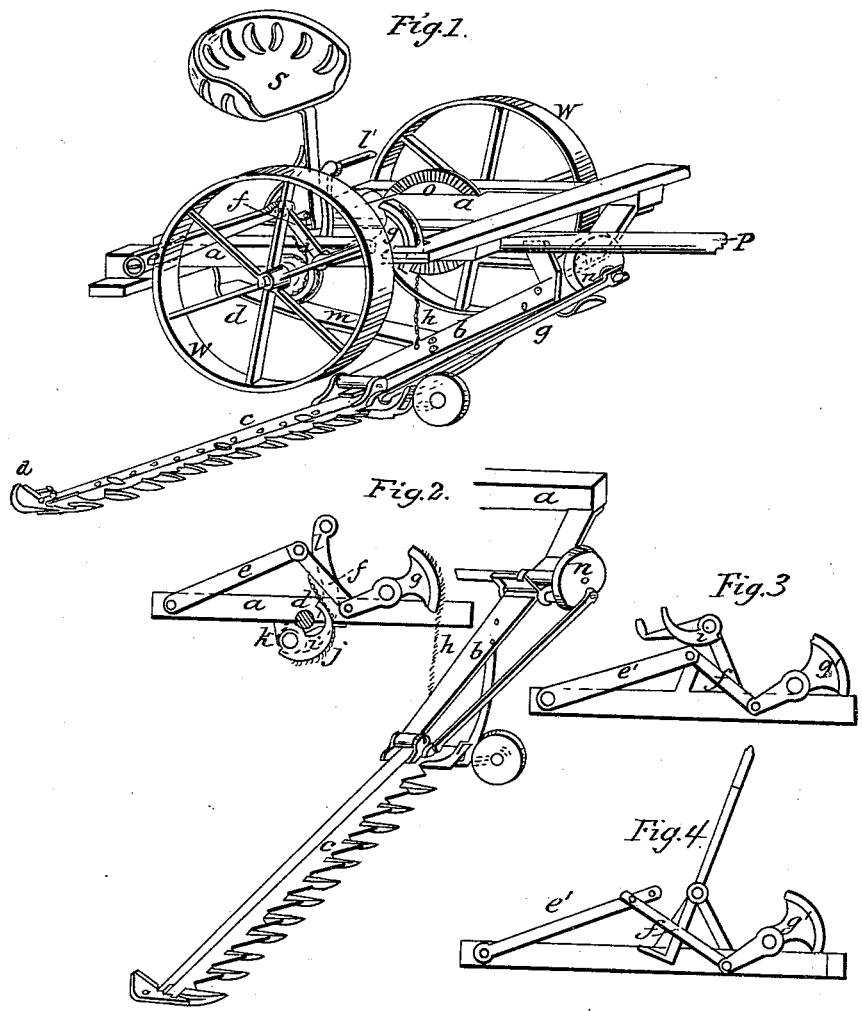

UNITED STATES PATENT OFFICE.

ANDREW B. BARNARD, SHERMAN R. NYE, AND RICHARD L. HEWETT, OF WEST FITCHBURG, MASSACHUSETTS.

IMPROVEMENT IN HARVESTERS.

Specification forming part of Letters Patent No. 81,129, dated August 18, 1868.

*To all whom it may concern:*

Be it known that we, ANDREW B. BARNARD, SHERMAN R. NYE, and RICHARD L. HEWETT, of West Fitchburg, in the county of Worcester and State of Massachusetts, have invented a new and useful Improvement in Harvesting-Machines, of which the following is a full, clear, and exact description, reference being had to the accompanying drawings, making a part of this specification, in which—

Figure 1 represents a perspective view of a machine embodying our improvement. Fig. 2 is a view of the improvement in detail. Figs. 3 and 4 are modifications of the same.

The object of our invention is to provide a simple and efficient means for elevating the finger-bar and cutters from the ground, so as to enable them to pass over any obstructions, and that the same may be operated by the driver's foot or hand, as is the usual practice, thus leaving the hands free to manage the team.

The invention consists in the employment of a compound lever, pivoted at one end to the frame of the machine, and at the other end attached to the arm of a cam-lever, pivoted at or near its center to the frame. To the cam-lever is attached a chain, which is connected in any suitable manner with the finger-bar, by which the cutter is raised. The compound lever is connected by a chain to another cam or lever, suitably attached to the frame, which cam or lever is operated by means of a lever under the control of the driver.

Referring to the drawings, Fig. 1 represents a harvester of the ordinary construction in its general features. $a$ $a$ is the frame, supported upon the axle $d$, to which is attached the large gear-wheel $o$, from which latter motion is imparted to the cutters in the usual manner.

To one side of the frame $a$ is pivoted the arm $e$ of the compound lever $e$ $f$, and the arm $f$ is pivoted to one end of the swinging lever $g$, which lever is also pivoted to the frame $a$. The outer end of the lever $g$ is of segmental form, and on its outer portion is attached a chain, $h$, the lower end of which is attached to the coupling-arm $b$, and to which latter is attached the cutter-bar $c$.

$i$ represents a cam-lever, of the form shown in Fig. 2, and secured to a shaft, which is journaled in a hanger, $k$, attached to the under side of the frame $a$.

The shaft which carries the cam-lever $i$ extends inward, and to its inner end is attached a lever, $l$, which is provided with a foot-piece, $l'$, placed within convenient reach of the driver's foot.

To the cam $i$ is attached a chain, $j$, the end of which is connected with the arm $f$ of the compound lever.

It will thus be seen that, by pressing the foot upon the lever $l$, the cam $i$ will be turned downward, thus drawing down, by means of the chain $j$, the arm $f$ of the compound lever. This in turn operates the lever $g$, to elevate the finger-bar and cutters.

The compound lever $e$ $f$ may be arranged to operate below the beam of the frame, instead of above, as shown, and the levers or cams $i$ $g$ may be of any other form, if desirable.

When the finger-bar and cutters are placed at the rear of the machine, instead of at the front, as above described, the position of the levers $e$, $f$, and $g$ would be reversed, and they be made to operate in a manner similar to that described.

Figs. 3 and 4 are modifications of our invention. In Fig. 3 the compound lever $e'$ $f'$ is operated by means of the direct action of the cam $i$, which is so arranged that in moving the foot-lever the face of the cam will bear upon some portion of the compound lever, so as to depress it, and thereby operate the lever which elevates the cutter-bar. In Fig. 4 the compound lever is shown as operated by means of a hand-lever.

What we claim as new, and desire to secure by Letters Patent, is—

The combination of the compound lever $e$ $f$, the cam-lever $g$, with the cam-lever $i$ and foot-lever $l$, or their equivalents, substantially as and for the purpose set forth.

In testimony whereof we have signed our names to this specification in the presence of two subscribing witnesses.

ANDREW B. BARNARD.
    SHERMAN R. NYE.
    RICHARD L. HEWETT.

Witnesses to Barnard and Nye:
 JAMES BROWN,
 CHARLES B. SMEAD.

Witnesses to Richard L. Hewett:
 JAS. M. FESSENDEN,
 SAML. BENTLEY.